June 11, 1968 — J. D. GIULIE ET AL — 3,387,679

SCALE PRELOADING MECHANISM

Filed Dec. 2, 1966

INVENTORS
JOE D. GIULIE
LESLIE N. WILDER

BY
ATTORNEYS

United States Patent Office 3,387,679
Patented June 11, 1968

3,387,679
SCALE PRELOADING MECHANISM
Joe D. Giulie, Sunnyvale, and Leslie N. Wilder, San Jose, Calif., assignors to Icore Industries, a corporation of California
Filed Dec. 2, 1966, Ser. No. 598,683
4 Claims. (Cl. 177—164)

ABSTRACT OF THE DISCLOSURE

A high speed scale mechanism embodying a preloading mechanism said preloading mechanism including a leaf spring connected by means of a connecting member through an adjusting member mounted on the frame of the scale wherein a connecting member is free to pivot at both ends thereof.

This invention relates to a scale mechanism and more particularly relates to an improvement in the preloading mechanism for a high speed scale such as the one described in U.S. Patent No. 3,148,742.

In such high speed scales, it is customary to provide a scale wherein the beam movement is extremely limited and the scale is heavily preloaded. In such scales, an overweight or onweight article placed on the scale results in a limited beam movement while an underweight article results in little or no movement. In the scales heretofore known, preloading was accomplished by various means such as torsion bars or coil springs which were expensive to construct and which easily got out of adjustment.

In accordance with the present invention, an improved form of scale is provided wherein the preloading is accomplished by a simple leaf spring with an adjusting mechanism thereon so that the scale is simple and inexpensive to construct and the adjusting mechanism for determining the degree of preload is simple and rugged and does not easily get out of adjustment.

The preload system of the present invention minimizes the effect of bending or other strains in the base of the scale and also makes it easy to compensate for temperature variations.

Figure 1:
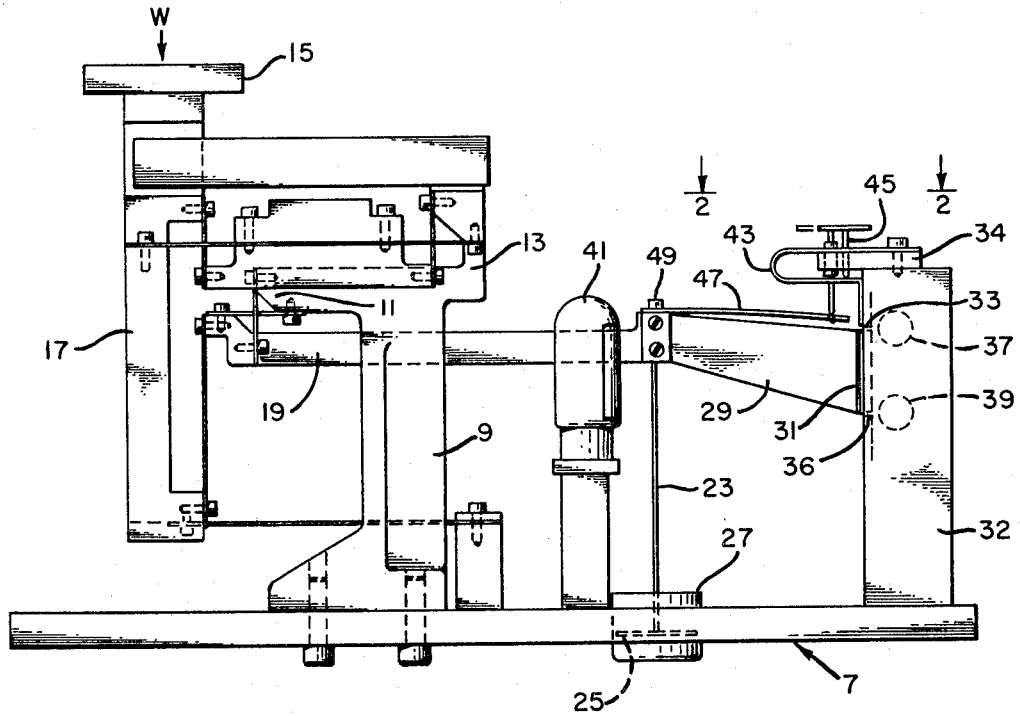
Figure 2:
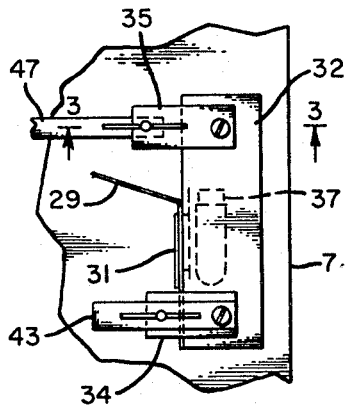
Figure 3:
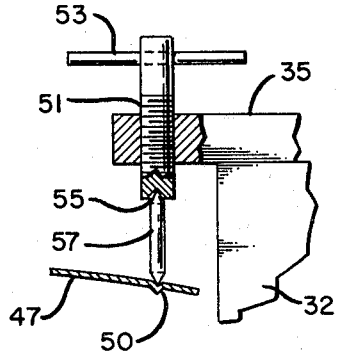
Figure 4:
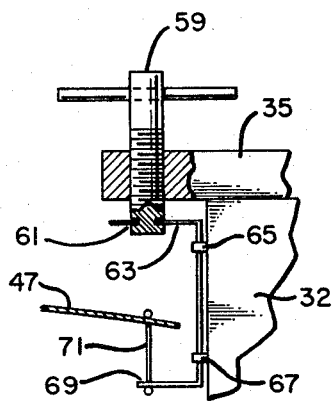
Figure 5:
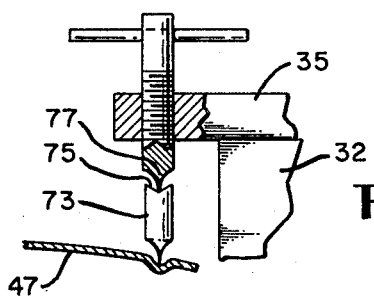

In the drawings forming part of this application:
FIGURE 1 is a side view of a scale embodying the present invention;
FIGURE 2 is a partial plan view from the line 2—2 of FIGURE 1;
FIGURE 3 is an enlarged section on the line 3—3 of FIGURE 2; and
FIGURE 4 is a partial view, similar to FIGURE 3, showing an alternate embodiment of the invention;
FIGURE 5 is a partial view similar to FIGURE 3, showing an alternate pin arrangement.

Turning now to a description of the drawings by reference characters, the scale embodies a base member, generally designated 7, having a pillar 9 thereon for supporting the scale mechanism. Pillar 9 is bifurcated to provide a forward arm 11 and a rear arm 13. The scale includes a pan 15 mounted on arms 17 which in turn are connected to the beam of the scale 19. In the scale illustrated, instead of using the usual knife edges, crossflexes are provided to connect the frame, beam and pan support members. These are not described in detail since they are well-known to those skilled in the art and are described precisely in the above-mentioned Patent 3,148,742. Further, the preloading structure of the present invention is equally applicable to scales having knife edges. Suffice it to say that as a weight is placed on the pan 15, the right hand side of the beam 19 tends to rise.

Scale beam 19 includes a rod 23 which extends to piston 25 in dash pot 27 to dampen vibration of the beam.

At the opposite end of frame 7, pillar 32 is provided having extension arms 34 and 35 thereon. The pillar 32 supports an electric eye mechanism while arm 34 supports a slit adjusting mechanism and arm 35 supports the preloading mechanism. Connected to the end of beam 19 is an arm 29 carrying a flag 31 thereon which is adapted to move between slits 33 and 36 which control light reaching photoelectric cells 37 and 39. A light source 41 is provided as well as an adjusting arm 43 having a screw mechanism 45 for the exact positioning of the upper slit 33. The lower, or under slit 36 is separately adjustable by means not shown. In the embodiment of the invention illustrated, an onweight article will allow light to fall on cells 37 and 39, an over weight article will cause light to fall on only cell 39, while an under weight article will cause light to fall on only cell 37. The mechanism thus far described is well known to those skilled in the art and forms no part of the present invention.

In accordance with the present invention the end of the beam 19 is provided with a leaf spring 47 secured thereto by screw 49. At the terminal end of spring 47 a dimple 50 is provided and directly above this dimple, an adjusting screw 51 having a handle 53 is threadably mounted in the arm 35. The bottom of screw 51 has a concave portion 55 directly opposite dimple 50. In this embodiment of the invention, a pin 57 which is sharpened at both ends extends between the dimple 50 and the concave portion 55 of screw 51. Since pin 57 is sharpened at both ends the area of contact between the pin and the screw as well as between the pin and the spring is very small, there is little friction and no hysteresis. It is apparent that by merely adjusting the handle 53 any desired degree of pretension can be placed on the spring 47.

In FIGURE 4 an alternate embodiment of the invention is illustrated. Here instead of using the pin pushing down on the leaf spring, a flexible member is used to pull the preloading spring from below. Adjusting screw 59 is provided as before but this screw has an annular recess 61 near the bottom thereof which is adapted to receive a slider 63 which slides in the guides 65 and 67. At the bottom end of slider 63 an outward extension 69 is provided. A flexible member 61 which may be made of metal or fiber extends between member 69 and the leaf spring 47. Here the operation is exactly the same as that described above except that the spring is pulled from below by the flexible member 71. Since the member 71 is extremely flexible, there is substantially no friction loss or hysteresis in the linkage.

In the embodiment of the invention shown in FIGURE 5, an alternate form of pin 73 is shown having a concave top 75 which the adjusting screw has a mating point 77. Otherwise the structure is the same as previously described.

It is believed apparent from the foregoing that we have provided a novel means of spring preloading for a platform scale which is simple and inexpensive, which is easy to adjust and which does not tend to get out of adjustment. Bending, or other strains in the base 7, have little if any effect on the leaf spring preload because only normal forces can be transmitted from arm 35 to beam 19. Further, temperature compensation is easily effected by the construction of the present invention.

We claim:
1. In a scale having a frame, a weighing pan and a beam wherein the weighing pan is at one end of the beam, the improvement comprising a preloading leaf spring extending from the end of said beam opposite the weighing pan, an adjusting member mounted adjacent said leaf spring and operatively connected to the framework of the scale and a connecting member extending between and connecting said adjusting member and the leaf spring at a point near the free end of the leaf spring, said connecting member being free to pivot at both ends thereof.

2. The structure of claim 1 wherein the adjustment member comprises a screw having a concave end thereon and said leaf spring has a mating dimple and the connecting member comprises a pin sharpened on both ends extending between said dimple and said concave end.

3. The structure of claim 1 wherein the adjustment member includes a screw having a sharpened end thereon and the connecting member comprises a pin having a mating concave portion in contact therewith.

4. The structure of claim 1 wherein the connecting member is flexible.

References Cited

UNITED STATES PATENTS

| | | | |
|---|---|---|---|
| 1,692,102 | 11/1928 | Weber | 177—229 X |
| 2,821,376 | 1/1958 | Aston | 177—168 X |
| 3,026,954 | 3/1962 | Appius | 177—248 |
| 3,168,154 | 2/1965 | Chappell et al. | 177—168 X |

RICHARD B. WILKINSON, *Primary Examiner.*

GEORGE H. MILLER, JR., *Assistant Examiner.*